United States Patent [19]

Douklias

[11] 3,822,930
[45] July 9, 1974

[54] MULTICHANNEL LIGHT EFFECT GENERATOR

[75] Inventor: Nikolaos Douklias, Munich, Germany

[73] Assignee: Siemens Aktiengesellschaft, Berlin & Munich, Germany

[22] Filed: Sept. 14, 1972

[21] Appl. No.: 289,058

[30] Foreign Application Priority Data
Sept. 15, 1971 Germany............................ 2146154

[52] U.S. Cl. ...................... 350/162 R, 350/162 ZP
[51] Int. Cl. ............................................ G02b 5/18
[58] Field of Search...... 350/162 R, 162 SF, 162 ZP

[56] References Cited
UNITED STATES PATENTS

| | | | |
|---|---|---|---|
| 3,392,400 | 7/1968 | Lamberts et al. | 350/162 X |
| 3,453,035 | 7/1969 | Walther | 350/162 X |
| 3,510,223 | 5/1970 | Lohmann | 350/162 X |
| 3,584,948 | 6/1971 | Herriott | 350/162 X |

*Primary Examiner*—William F. Lindquist
*Attorney, Agent, or Firm*—Hill, Gross, Simpson, Van Santen, Steadman, Chiara & Simpson

[57] ABSTRACT

A multichannel light effect generator for creating lighting effects and light figures having one or more coherent light sources for producing one or more beams of coherent light and directing the beams onto a light effect member to produce light patterns and figures visible to an observer characterized by one or more diffraction gratings disposed between the sources and the light effect member to dissect the beams into a plurality of diffraction orders. The diffraction gratings may be either stationary or moving and the light effect members may be either stationary or moving. In one embodiment, all of the diffraction orders are projected onto one or more light effect members and in another embodiment, one or more light effect members is provided for each of the diffraction orders.

10 Claims, 2 Drawing Figures

3,822,930

MULTICHANNEL LIGHT EFFECT GENERATOR

BACKGROUND OF THE INVENTION

1. Field of the Invention

The present invention is directed to a multichannel light effect generator for creating lighting effects and light figures.

2. Prior Art

Prior art light effect generators utilize aereal projection of incoherent light through dissipating members such as prisms, double refracting foils, and other devices, to achieve special lighting effects for certain applications such as in stage lighting or in illuminating advertisement. It has been proposed to create lighting effects and light figures by utilizing one or more coherent light beams projected on one or more light effect members which may be either stationary or moving and either regular or irregular to cause light scatter and crossing to produce interference based on the coherent characteristics of the light to develop a lighting effect or pattern which is projected onto a screen. However, in these proposed devices, the creation of different and locally separate light figures and effects is possible in only two parallel projection channels.

SUMMARY OF THE INVENTION

The present invention is directed to a multichannel light effect generator for creating an increased number of lighting effects and light figures which can be adjustably moved in both radial and tangential directions. The invention utilizes one or more sources of coherent light to produce one or more beams of coherent light directed onto at least one light effect member with means for dissecting the beam or each of the beams into a plurality of diffraction orders. The means for dissecting the beam is preferably either stationary or moving a two-dimensional grating which can be either a phase or amplitude grating. In one embodiment of the invention, all of the diffraction orders are acted on by one or more light effect members which may be stationary or have means for moving the member. Another embodiment of the invention, a plurality of light effect members are provided with each member acting only on a single diffraction order and the members may be either stationary or provided with means for moving the member as it is acting on the light of the diffraction order.

DESCRIPTION OF THE PREFERRED EMBODIMENTS

Figure 1:
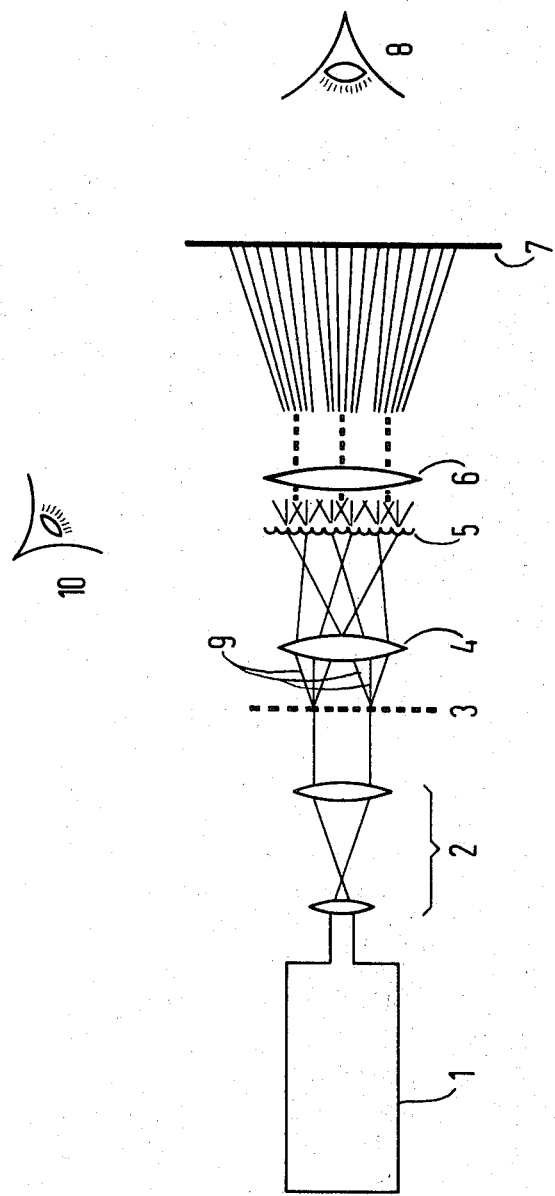
FIG. 1 is a schematic presentation of the device of the present invention.

The principles of the present invention are particularly useful in a light effect generator schematically illustrated in the FIG. 1. The generator comprises at least one source of coherent light such as a laser 1 which produces a beam of coherent light which is projected through a beam expansion system 2 comprising lenses and then through means for dissecting the beam into a plurality of diffraction orders which means is illustrated as a two-dimensional diffraction grating 3. As the light passes through the diffraction grating 3, which may be either a phase or an amplitude grating, the beam is diffracted into a series of diffraction orders 9 received by a focusing lens 4 and projected on one or more light effect members 5, which as illustrated are light permeable light effect members. The light as it leaves the light effect member 5 is then received by an expansion lens 6 and projected on a screen 7 to produce a plurality of light effects or figures which may be either viewed through the screen by an observer at 8 or on the screen by an observer positioned at 10.

To create a stationary light interference phenomenon over a larger area and distance, the coherent light emitted by the laser 1 is rendered divergent by the expansion system 2 and is directed onto one or more light effect members 5. The light leaves the members 5 at various angles corresponding to the structure of the members 5 and crosses to create a light interference pattern which is stationary if the members 5 are stationary. The result of this procedure is the creation of an esthetic and impressive light figure which can be observed on screen 7.

If the members 5 are illuminated by more than one beam of coherent light, a multiple of light figures are produced. By providing a means 3 for dissecting a light beam into diffraction orders, a single laser beam is converted into a plurality of beams to produce the multitude of light figures. The grating can have a structure which has a constant period or varying period. If the grating is moved with respect to the light beam, the light figures will move on the screen. For example, if the grating is rotated by means on the axis of the laser beam, the higher diffraction orders will be rotated about the zero diffraction order. By rotating the grating on an axis vertical to the axis of the laser beam, the effective grating constant changes and causes the light figures to move radially on the screen 7.

A superimposing of light figures along two coordinate directions can be achieved by using a single means having a diffraction grating extending in both coordinate directions or by using two separate gratings arranged in a different coordinate direction. By rotating the grating of the single means or both gratings together, moving light figures are produced. If the two gratings are moved relative to each other either by rotating one grating and holding the other grating or by rotating one grating faster than the other, the diffraction orders produced by means 3 will shift positions, causing moving and changing interference patterns with corresponding moving and changing light figures on the screen.

By adjusting the axial position of the focusing lens 4, the size of the light figure can be adjusted. By shifting the axial position of the lens 4 during projection of the light figures, a changing of the size of the figures will occur.

Figure 2:
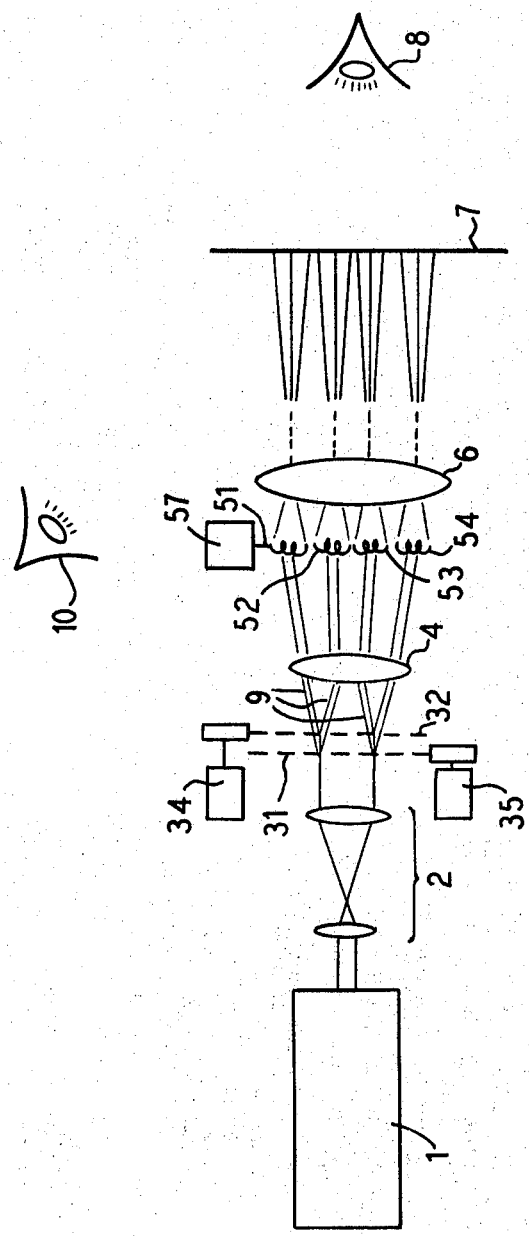
FIG. 2 is a schematic of another embodiment.

The complexity of the projected light figure can be changed by using more than one light effect member as shown in FIG. 2. For example, a member having a sine-shape thickness fluctuation used with either moving gratings 31 and 32 driven by motor means 34 and 35, respectively, or another moving effect member will produce moving light figures resembling the movement of a snake or progressing wave motion. The plurality of light effect members 51–54 may be arranged to receive all of the diffraction orders, or the light effect members may be arranged to receive light of a single diffraction order so that each individual diffraction order has at least one light effect member associated therewith and acting thereon.

The light effect member may be stationary or provided with motor means 57 for moving one 5 or all members 51–54 either together or at different speeds. The members may also have either a regular or irregular structure. As mentioned above, the members 5 are light-permeable to either bend, diffract or refract the light passing therethrough. A reflecting light effect member or members can also be used by positioning the lens 6 and the screen to receive the reflected light waves.

Light figures of different colors can be produced with the generator of the present invention by using laser beams of different colors. By alternately using the light sources, light figures of different colors can be created on the screen 7.

As mentioned hereinabove, the light effect generator can be used for stage lighting or for illuminating advertising surfaces or displays. The device can also be utilized in the production of photographs or movie pictures of the various light patterns and figures which pictures can be subsequently projected as desired.

In all of the above-described embodiments and variations, the major advantage of the generator is that the intensity of the light is distributed very evenly on a large surface.

Although various minor modifications may be suggested by those versed in the art, it should be understood that I wish to employ within the scope of the patent granted hereon all such embodiments as reasonably and properly come within the scope of my contribution to the art.

I claim:

1. A multichannel light effect generator for creating light effects and light figures consisting solely of at least one source of coherent light projecting an unmodified beam of coherent light having a substantial cross-sectional area, means disposed in the path of said beam of coherent light for dissecting said light beam into a multitude of diffraction orders, and at least one light effect member receiving said dissected light after it has passed through said dissecting means and creating a plurality of light interference patterns from said dissected light beam.

2. A multichannel light effect generator according to claim 1, wherein said means for dissecting comprises a two-dimensional phase grating.

3. A multichannel light effect generator according to claim 1, wherein said means for dissecting is a two-dimensional amplitude grating.

4. A multichannel light effect generator according to claim 1, wherein said means for dissecting is a stationary two-dimensional grating.

5. A multichannel light effect generator according to claim 1, wherein said means for dissecting is a moving two-dimensional grating.

6. A multichannel light effect generator according to claim 1, wherein the light effect member is arranged to receive all of the diffraction orders produced by the dissecting means.

7. A multichannel light effect generator according to claim 6, which includes means for moving the light effect member.

8. A multichannel light effect generator according to claim 1, wherein a plurality of light effect members are provided and, said members being arranged to receive only light of a single diffraction order so that each individual diffraction order has at least one light effect member associated therewith.

9. A multichannel light effect generator according to claim 8, which includes means for moving at least one of said light effect members.

10. A multichannel light effect generator according to claim 1, wherein the means for dissecting comprises a pair of diffraction gratings and means for moving one grating relative to the other grating of the pair.

* * * * *